United States Patent [19]

Hsu

[11] Patent Number: 4,993,380
[45] Date of Patent: Feb. 19, 1991

[54] LUBRICATION MECHANISM OF ENGINE CYLINDER

[76] Inventor: Shin-I Hsu, 10F-1, No. 450, Cheng Te Road, Taipei, Taiwan

[21] Appl. No.: 460,244

[22] Filed: Jan. 2, 1990

[51] Int. Cl.⁵ .............................................. F01B 3/110
[52] U.S. Cl. .............................. 123/193 C; 123/196 R; 184/18; 92/153
[58] Field of Search ......... 123/193 C, 196 R, 193 CP; 184/6.8, 18; 92/153

[56] References Cited

U.S. PATENT DOCUMENTS

| | | | |
|---|---|---|---|
| 1,871,820 | 8/1932 | Morton | 184/18 |
| 2,141,150 | 12/1938 | Fitch | 184/18 |
| 3,548,721 | 12/1970 | Eisennegger | 184/18 |

Primary Examiner—E. Rollins Cross
Attorney, Agent, or Firm—Bacon & Thomas

[57] ABSTRACT

A lubrication mechanism for an engine cylinder includes upper and lower ring troughs on the inside wall of the engine cylinder. The two ring troughs can accommodate oil pipes and ring oil nets. The oil pipes include an inlet pipe and an outlet pipe. Channels and numerous oil pores are defined by the pipes to allow the entrance of lubricating oil into the oil pipes, and seepage from the pores on the oil pipe, through a ring oil net to provide lubrication to the inside wall of the cylinder. The lubricating oil then flows downwardly to the lower ring oil net, through the net and the oil pipe, and into an outlet pipe for discharge.

7 Claims, 3 Drawing Sheets

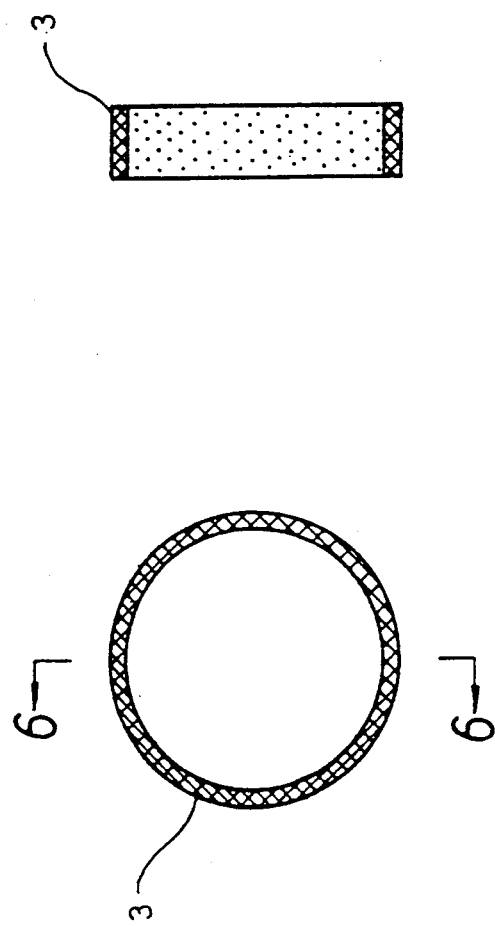

LUBRICATION MECHANISM OF ENGINE CYLINDER

BACKGROUND OF THE INVENTION

In a conventional engine cylinder, the oil needed for lubrication is often added into the fuel. Because the added engine oil is mixed in the fuel, a part of the fuel particles are covered by the oil particles, so, the fuel particles cannot be consumed completely causing air pollution and waste of fuel. In addition, the mixture of lubricating engine oil and fuel will have the effect of incompletely lubricating the cylinders.

SUMMARY OF THE INVENTION

A type of lubrication mechanism for an engine cylinder includes upper and lower ring troughs on the inside wall of the engine cylinder. The two ring troughs can respectively accommodate oil pipes and ring oil nets. The oil pipes include an inlet pipe and an outlet pipe. Channels and numerous oil pores are defined by the pipes to allow the entrance of lubricating oil into the oil pipes, and seepage from the pores on the oil pipe, through a ring oil net to provide lubrication to the inside wall of the cylinder. The lubricating oil then flows downwardly to the lower ring oil net, through the net and the oil pipe, and into an outlet pipe for discharge.

The purpose of subject invention is to provide a type of lubrication mechanism for an engine cylinder, such that the oil required for lubricating the cylinder will no longer be mixed with the fuel. Thus, the fuel can achieve complete combustion and will not result in air pollution, and at the same time achieving 100% lubricating effect on the cylinder.

BRIEF DESCRIPTION OF THE DRAWINGS

FIG. 5 is a top view of one of the ring oil nets utilized with the invention.

FIG. 6 is a cross-sectional view taken along line 6—6 in FIG. 5.

DETAILED DESCRIPTION OF THE PREFERRED EMBODIMENT

Figure 2:
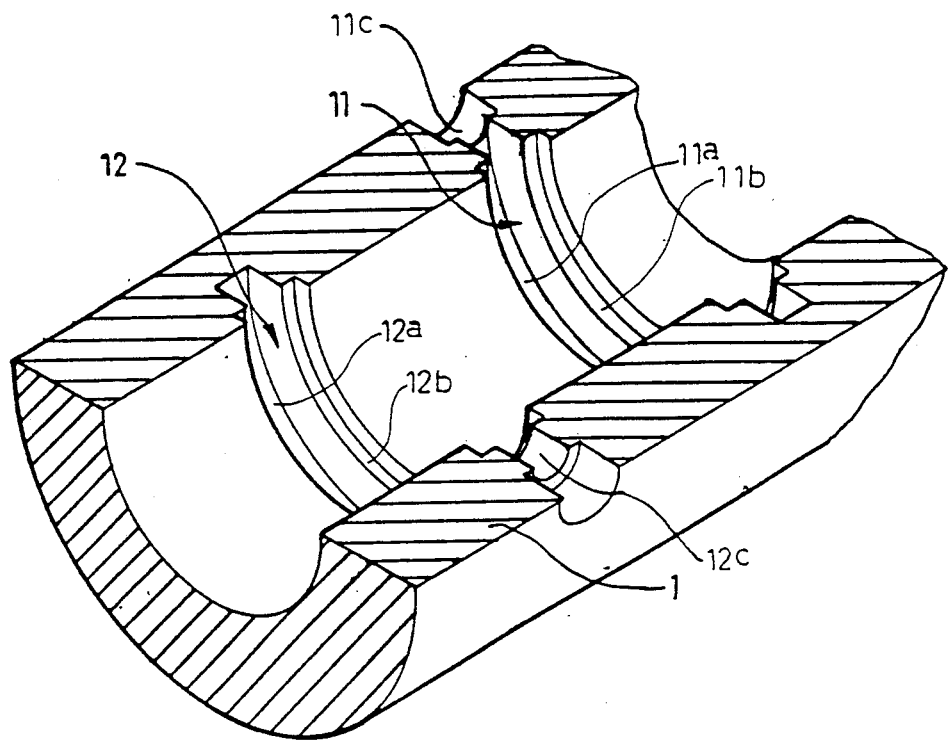
FIG. 2 is a partial, cross-sectional, perspective view of an inside wall of the cylinder shown in FIG. 1.

Referring to FIG. 2, formed on an inside wall of the cylinder body (1) are a first ring trough (11) and a second ring trough (12). Each ring trough has a deeper indentation (11a, 12a) and shallower indentation (11b, 12b) formed on each side of the deeper indentation. The first and second ring troughs (11, 12) respectively have a communicating opening (11c) and (12c).

Figures 3, 4:
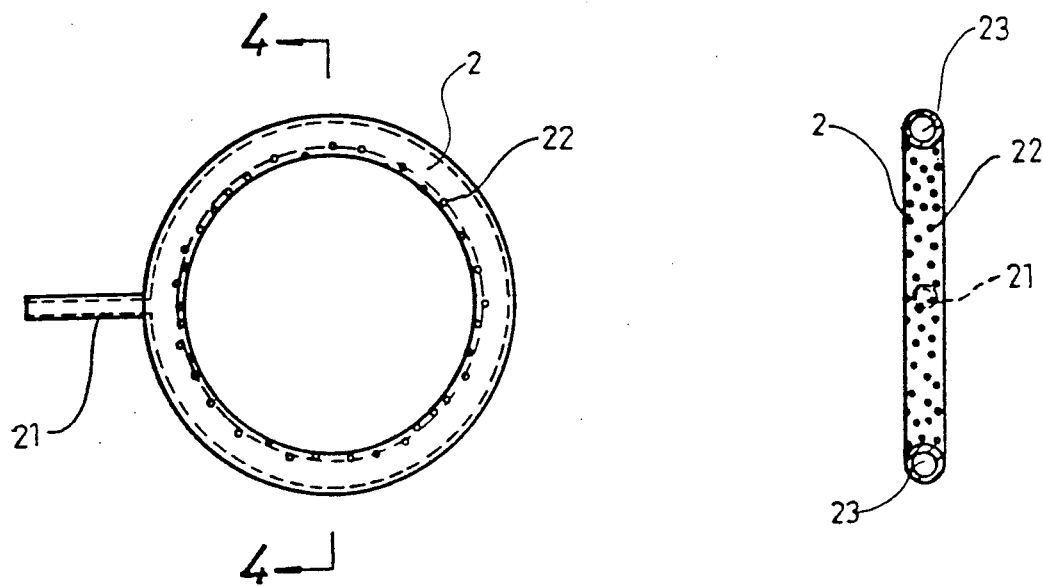
FIG. 3 is a top view of one of the oil pipes utilized with the invention.
FIG. 4 is a cross-sectional view taken along line 4—4 in FIG. 3.

FIGS. 3 and 4 illustrate the construction of the oil pipe (2) which is made of heat-resistant steel material. The main body of oil pipe (2) is slightly resilient and can be inserted into ring troughs (11a) and (12a) through the inside of the cylinder body (1). A ring-shaped oil net (3), as illustrated in FIGS. 5 and 6 can be inserted in the first shallower ring trough (11b) and the second shallower trough (12b). The inner diameter of the ring oil net (3) is flush with that of the inner wall of the cylinder body (1) so that the piston can smoothly pass in the inside diameter of the ring-shaped oil net (3).

Figure 1:
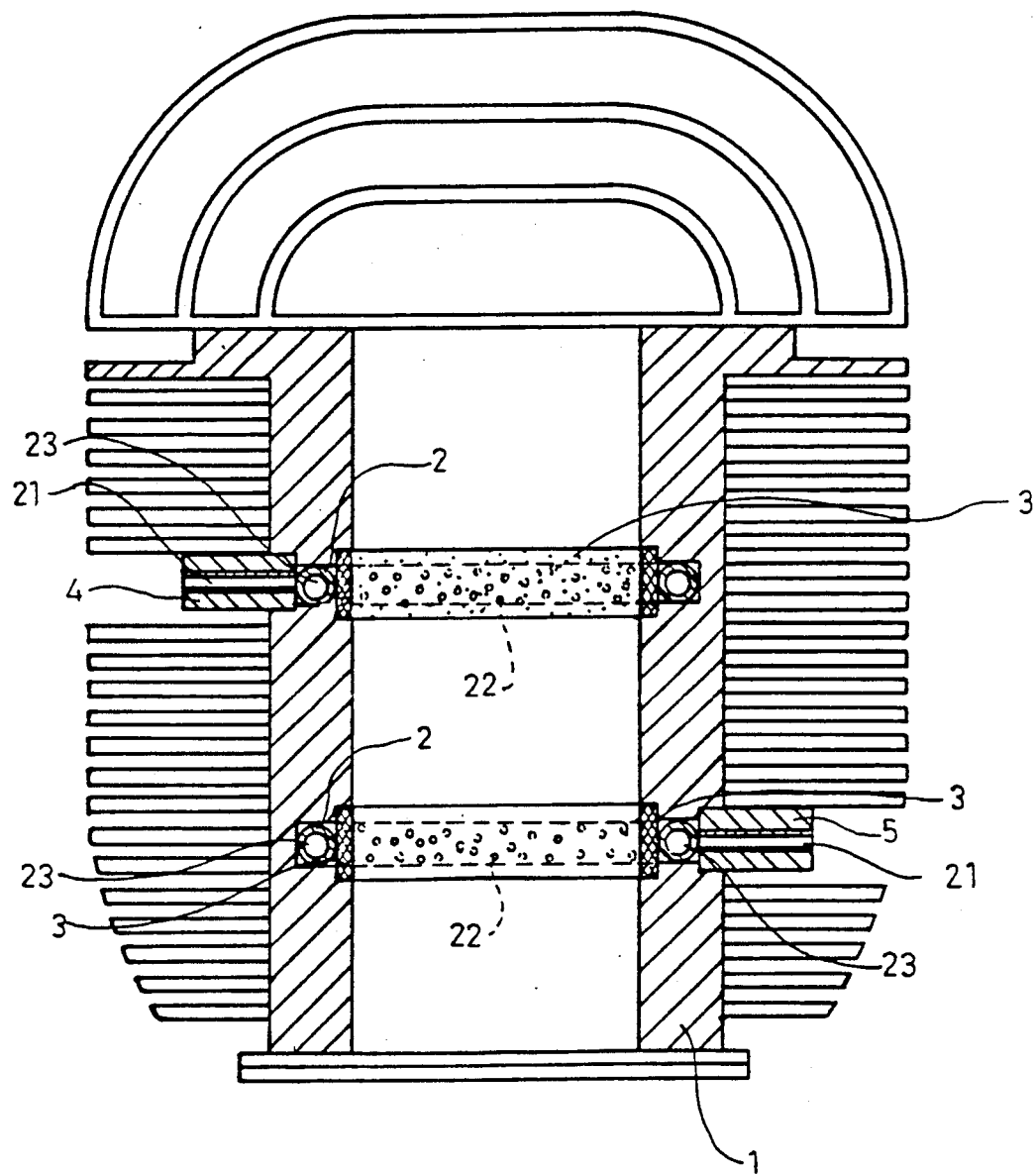
FIG. 1 is a cross-sectional view of a cylinder incorporating the subject invention.

Referring to FIG. 1, it can be seen that the first and second ring troughs (11, 12) of the main cylinder (1) can accommodate an oil pipe (2) and a ring-shaped oil net (3). The communicating pipe (21) of the oil pipe (2) located in ring trough (11) communicates with an oil inlet tube (4), so that lubricating oil can be fed into the oil tube communicating pipe (2), seep through the channel (23) and through the plurality of seeping oil holes (22) to the ring-shaped oil net (3). The oil then seeps through the ring-shaped oil net (3), to lubricate the inside wall of the cylinder body (1). Due to gravity, the lubricating oil gradually flows downwardly to the ring-shaped oil net (3) in the second ring trough (12). The oil then seeps out through the ring-shaped oil net (3) into the channel (23) through the plurality of oil holes (22) on the oil pipe (2). Oil is then discharged from the outlet oil pipe (5) through the communicating tube (21). Thus, the lubricating oil can circulate in this way and achieve a continuous lubricating function without mixing the lubricating oil with the fuel. The fuel can have complete combustion and will not cause air pollution, while, at the same time the cylinder will be 100% lubricated. According to the result of experiments, 25%–30% of fuel can be thus saved and horsepower incresed by 20%.

I claim:

1. A lubrication system for an engine cylinder having an inner wall comprising:
    (a) a first ring trough defined by the inner wall of the cylinder, the first trough opening into the cylinder;
    (b) a second ring trough defined by the inner wall of the cylinder, the second trough opening into the cylinder and being axially spaced from the first ring trough;
    (c) oil distribution means located in the first ring trough and communicating with a lubricating oil source such that lubricating oil is distributed on the inner wall of the cylinder; and,
    (d) oil collecting means located in the second ring trough having an oil outlet pipe to collect oil from the inner wall of the cylinder and direct it to the outlet pipe.

2. The lubricating system of claim 1 wherein the oil distribution means comprises:
    (a) an oil distribution pipe located in the first ring trough, the oil distribution pipe having an inlet tube and defining a plurality of oil distribution holes; and,
    (b) an oil net located in the first ring trough between the oil distribution pipe and the inner wall of the cylinder.

3. The lubricating system of claim 2 wherein the oil distribution pipe is generally annular in configuration.

4. The lubricating system of claim 2 wherein the oil net is generally annular in configuration.

5. The lubricating system of claim 1 wherein the oil collecting means comprises:
    (a) an oil collecting pipe located in the second ring trough, the oil collecting pipe having an outlet tube and defining a plurality of oil collecting holes; and,
    (b) an oil net located in the second ring trough between the oil collecting pipe and the inner wall of the cylinder.

6. The lubricating system of claim 5 wherein the oil collecting pipe is generally annular in configuration.

7. The lubricating system of claim 6 wherein the oil net is generally annular in configuration.

* * * * *